United States Patent
Rupp et al.

(10) Patent No.: US 7,526,632 B1
(45) Date of Patent: Apr. 28, 2009

(54) SYSTEM, APPARATUS AND METHOD FOR IMPLEMENTING MULTIFUNCTIONAL MEMORY IN RECONFIGURABLE DATA PATH PROCESSING

(75) Inventors: Charle' R. Rupp, Morgan Hill, CA (US); Jeffrey M. Arnold, San Diego, CA (US)

(73) Assignee: Stretch, Inc., Sunnyvale, CA (US)

( * ) Notice: Subject to any disclaimer, the term of this patent is extended or adjusted under 35 U.S.C. 154(b) by 372 days.

(21) Appl. No.: 10/971,372

(22) Filed: Oct. 22, 2004

Related U.S. Application Data

(63) Continuation-in-part of application No. 10/746,018, filed on Dec. 23, 2003.

(60) Provisional application No. 60/513,643, filed on Oct. 22, 2003.

(51) Int. Cl.
G06F 15/00 (2006.01)
G06F 15/76 (2006.01)

(52) U.S. Cl. ....................................................... 712/43

(58) Field of Classification Search ................... 712/43
See application file for complete search history.

(56) References Cited

U.S. PATENT DOCUMENTS

| | | | |
|---|---|---|---|
| 5,055,997 A | 10/1991 | Sluijter et al. | |
| 5,247,689 A | 9/1993 | Ewert | |
| 5,274,782 A | 12/1993 | Chalasani et al. | |
| 5,293,489 A | 3/1994 | Furui et al. | |
| 5,299,317 A | 3/1994 | Chen et al. | |
| 5,471,628 A | 11/1995 | Phillips et al. | |
| 5,684,980 A | 11/1997 | Casselman | |
| 5,850,564 A * | 12/1998 | Ting et al. | 712/37 |
| 6,092,174 A | 7/2000 | Roussakov | |
| 6,167,502 A | 12/2000 | Pechanek et al. | |
| 6,343,337 B1 | 1/2002 | Dubey et al. | |
| 6,557,092 B1 | 4/2003 | Callen | |
| 6,633,181 B1 | 10/2003 | Rupp | |
| 6,721,884 B1 * | 4/2004 | De Oliveira Kastrup Pereira et al. | 713/2 |
| 6,831,690 B1 | 12/2004 | John et al. | |

(Continued)

OTHER PUBLICATIONS

Hwang, Kai "Advanced Computer Architecture: Parallelism, Scalability, Programmability;" 1st Edition, Chapter 2, pp. 75-97; copyright 1993; by McGraw-Hill, Inc.; USA.

(Continued)

*Primary Examiner*—Eddie P Chan
*Assistant Examiner*—Brian P Johnson
(74) *Attorney, Agent, or Firm*—Cooley Godward Kronish LLP

(57) ABSTRACT

A system, apparatus and a method for implementing multifunctional memories is disclosed. The multifunctional memories perform a variety of functions during execution of extended instructions in a reconfigurable data path processor composed of processing nodes. In one embodiment, a processing node can be comprised of modular processing elements to perform computations associated with an extended instruction. Also, such a node includes at least two multifunctional memories and a data flow director configured to selectably couple the first multifunctional memory and the second multifunctional memory. The data flow director is configured to route data out from a first multifunctional memory of the two multifunctional memories while data is being routed into a second multifunctional memory. In another embodiment, a processing node is configured to compute a function output based on a number of Boolean functions, wherein at least one of the multifunctional memories is configured as a look-up table ("LUT").

37 Claims, 12 Drawing Sheets

U.S. PATENT DOCUMENTS

| | | |
|---|---|---|
| 6,883,084 B1 | 4/2005 | Donohoe |
| 6,996,709 B2 | 2/2006 | Arnold et al. |
| 2003/0046513 A1 | 3/2003 | Furuta et al. |
| 2004/0186872 A1 | 9/2004 | Rupp |
| 2004/0193852 A1 | 9/2004 | Johnson |
| 2005/0027970 A1 | 2/2005 | Arnold et al. |
| 2005/0027971 A1 | 2/2005 | Williams et al. |

OTHER PUBLICATIONS

U.S. Appl. No. 10/746,018, filed Dec. 23, 2003, Charle Rupp et al.

Xilinx, "Virtex™ 2.5 V Field Programmable Gate Arrays, Product Specification," DS003-2 (v2.8.1) Dec. 9, 2002, pp. 1-20.

Michael J. Wirthlin et al. "DISC: The dynamic instruction set computer," Proceedings SPIE, Field Programmable Gate arrays (FPGAs) for Fast Board Development and Reconfigurable Computing, Oct. 25-26, 1995, 14 pages.

* cited by examiner

Fig. 12B — a) 16 Bit View

Fig. 12C — b) 32 Bit View

US 7,526,632 B1

SYSTEM, APPARATUS AND METHOD FOR IMPLEMENTING MULTIFUNCTIONAL MEMORY IN RECONFIGURABLE DATA PATH PROCESSING

CLAIM OF PRIORITY

This application claims the benefit of U.S. Patent Application No. 60/513,643, filed on Oct. 22, 2003, and also is a continuation-in-part of U.S. patent application Ser. No. 10/746,018 entitled "Architecture and Method for Reconfigurable Data Path Processing," filed on Dec. 23, 2003, both of which are incorporated by reference in their entirety for all purposes.

FIELD OF THE INVENTION

The present invention relates generally to microprocessor architecture and reconfigurable processing. More particularly, the present invention relates to a system, apparatus and a method for implementing multifunctional memories disposed among reconfigurable computational elements to perform a variety of functions during execution of extended instructions.

BACKGROUND OF THE INVENTION

Some conventional programmable processors include dedicated memory blocks embedded in their programmable logic arrays to increase performance of the processor-oriented functions. Normally, these memories are intended to implement a wide range of functions, and therefore, are embedded into the arrays of programmable logic without adaptation. While functional, this general approach to implementing memory blocks in programmable logic arrays has several drawbacks.

The architectures of most well known programmable logic arrays tend to under-utilize the capabilities of the embedded memory blocks. Also, these arrays generally lack the control mechanisms as well as the data paths that are necessary to rectify the deficiencies in using the embedded memory blocks. To illustrate, consider that a register file ("RF") in a load-store based architecture normally maintains data, such as filter coefficients, that is subject to reuse during repetitious computations. Consequently, the one or more registers holding that data are deemed restricted, and thus are inaccessible for use by other computations. This stalls the completion of the other computations until the registers become available, or, the contents of the registers are jettisoned and then reloaded by performing multiple load and store instructions. This hinders processor performance by increasing instruction processing time and by consuming bandwidth in the data buses Memory blocks are also under-utilized because data paths do not efficiently introduce data efficiently into those memory blocks. Inefficiencies of loading data into embedded memory arise because reconfigurations of the programmable logic array are typically performed in series with the execution of instructions rather than in parallel. In addition, most known programmable processor architectures lack an efficient path over which to exchange input/output ("I/O") data streams between a peripheral device and the embedded memory blocks, other than by interrupting the continuous streams of I/O data (and a processor) to temporarily store the I/O data streams until the data can be discretely copied from external main memory to its destination. Also, there are generally no provisions to load I/O data into a memory block while an instruction is being executed in adjacent logic.

Further, scarce programmable resources that might be otherwise used to perform computations are usually reserved for interfacing the embedded memory blocks with the functionalities of the programmable logic. To implement "double buffering," for example, programmable resources must be dedicated to synthesize circuitry (e.g., multiplexers, etc.) to implement the swapping of buffers. Consider, too, that wide Boolean function implementations inputs) look-up tables ("LUTs"). But wide Boolean functions do not generally map efficiently to these small-sized LUTs.

Thus, there is a need for a system, an apparatus and a method to overcome the drawbacks of the above-mentioned implementations of embedded memory in traditional programmable logic arrays, and in particular, to effectively use embedded memory to increase processor performance and to preserve reconfigurable computation resources.

SUMMARY OF THE INVENTION

A system, apparatus and a method for implementing multifunctional memories are disclosed. The multifunctional memories are disposed among reconfigurable computational elements and perform a variety of functions during execution of extended instructions in a reconfigurable data path processor. In one embodiment, a reconfigurable data path processor is composed of processing nodes, each of which can be comprised of modular processing elements to perform computations associated with an extended instruction. Also, such a node includes at least two multifunctional memories and a data flow director configured to selectably couple the first multifunctional memory and the second multifunctional memory to the modular processing elements. The data flow director can be configured to route data out from a first multifunctional memory of the two multifunctional memories while data is being routed into a second multifunctional memory, among other various configurations. In another embodiment, the data routed into the second multifunctional memory includes configuration data to configure at least a portion of the modular processing elements during another interval of time, thereby minimizing time for changing configurations of the processing node. In yet another embodiment, the data routed into the second multifunctional memory includes a continuous stream of input/output ("I/O") data originating from a peripheral device. The processing node, in at least one embodiment of the present invention, further comprising a controller configured to store initial data in an additional multifunctional memory prior to run time of an application executing in the reconfigurable data path processor, and to store state data of the extended instruction from any of the modular processing elements, thereby maintaining the state data in the processing node rather than either a main memory or a register file during reuse of the state data.

In another embodiment of the present invention, a processing node executes extended instructions in a reconfigurable data path processor. The processing node can comprise modular processing elements, including reconfigurable circuits to perform computations associated with an extended instruction. Also included in a processing node is a multifunctional memory having a first memory portion and a second memory portion and a data flow director configured to selectably couple the first memory portion and the second memory portion to the modular processing elements. Further, such a node can include an exchanger circuit to implement the first and the second memory portions form a double buffer. In at least one embodiment, the processing further comprises a function generator circuit configured to generate a function generator output based on a number of Boolean functions from at least one of the memory portions, a common number of variables associated with the number of Boolean functions, and unique number of variables, wherein the at least one of the memory portions is a look-up table ("LUT").

BRIEF DESCRIPTION OF THE DRAWINGS

A more complete understanding of the present invention is apparent and more readily appreciated by reference to the following Detailed Description and to the appended claims when taken in conjunction with the accompanying Drawings wherein:

FIGS. 11 to 12D illustrate a labeling scheme for representing data stored in multifunctional memories in a manner that is recognizable by processing nodes and their computational resources, according to a specific embodiment of the present invention.

DETAILED DESCRIPTION OF EXEMPLARY EMBODIMENTS

Figure 1:
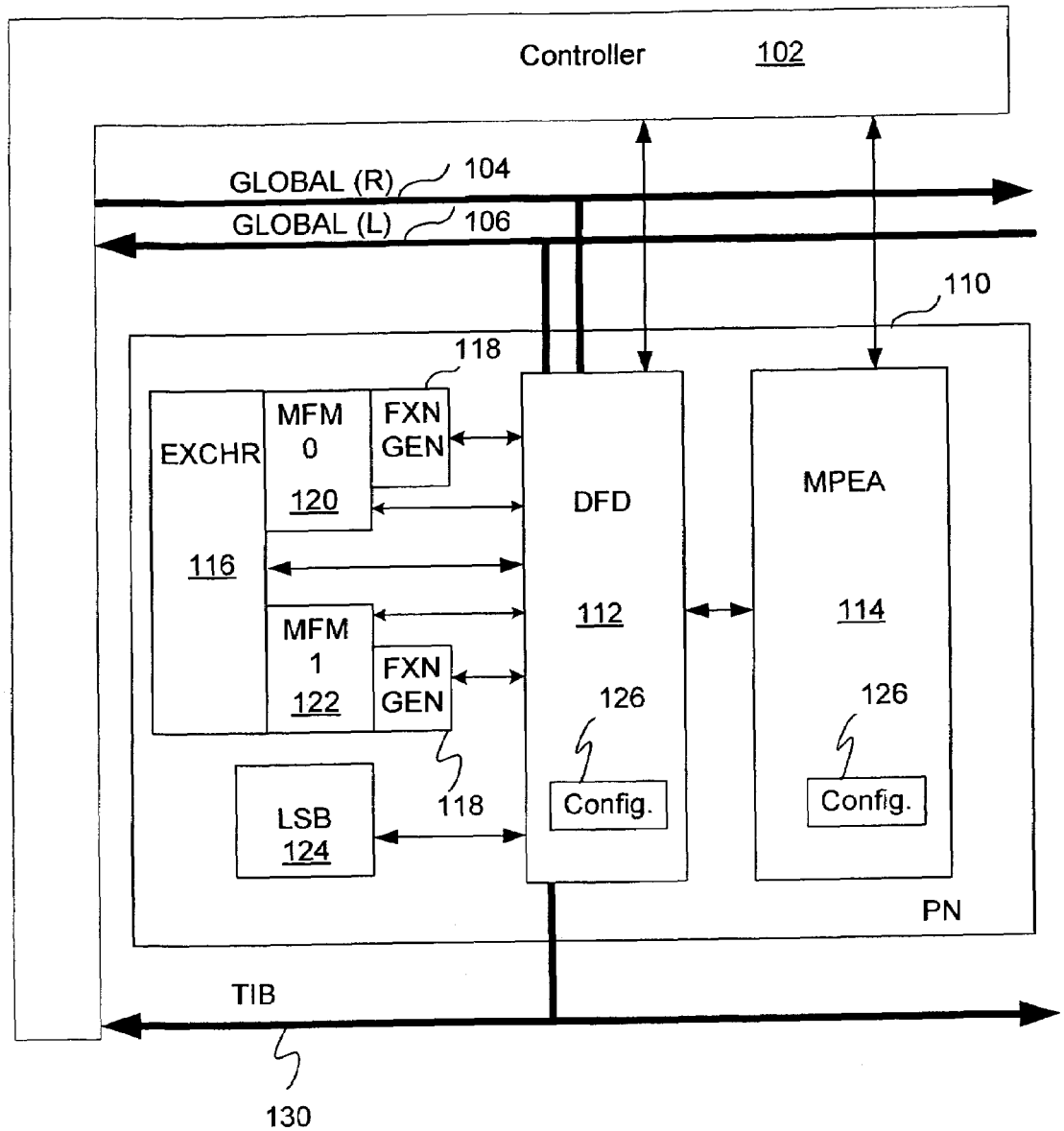
FIG. 1 is a diagram illustrating a processing node including multifunctional memory, according to one embodiment of the present invention.

FIG. 1 is a diagram illustrating a processing node that includes a multifunctional memory ("MFM"), according to one embodiment of the present invention. Processing node ("PN") 110 is configured to increase the utilization of embedded memory and/or to preserve reconfigurable resources for executing extended instructions. As shown, processing node 110 includes a data flow director ("DFD") 112 coupled to a modular processing element array ("MPEA") 114. MPEA 114 is an array of modular processing elements ("MPEs"), each of which is a reconfigurable computational element configurable to perform, for example, logical, arithmetic as well as other like operations, necessary to process extended instructions. Data flow director 112 has switch-like and/or multiplex-like functionalities to form data paths within processing node 110 as well as with external data paths beyond processing node 110. Data flow director 112 is also coupled to the following: a first multifunctional memory ("MFM 0") 120, a second multifunctional memory ("MFM 1") 122, an exchanger circuit ("EXCHR") 116, one or more function generator circuits ("FXN GEN") 118, and optional large-scale block circuits ("LSB") 124 to implement computationally-intensive functions that otherwise would be performed in programmable (or reconfigurable) resources. An LSB circuit 124 can be formed using "large scale integration" techniques, rather than using the same technology used to form the configurable resources, such as medium scale integration and/or the small scale integration techniques.

Processing node 110 is also coupled to a controller 102, a right global routing bus ("Global (R)") 104, a left global routing bus ("Global (L)") 106, and a Timpani Interface Bus ("TIB") 130, all of which enable data transfers in and out of processing node 110. Global routing buses 104 and 106 facilitate data communication among processing node 110, an extendable processor core (not shown), and a wide register file (not shown), as well as between two or more processing nodes 110. TIB bus 130 is a bus that can be configured to exchange data between processing node 110 and an external entity, such as a peripheral device, without transitorily buffering the data (e.g., in main memory). In particular, TIB 130 can be configured to exchange data via a direct memory access ("DMA") engine (not shown) with an external entity. As such, a processor need not control data exchanges between processing node 110 and external entities. Further, the exchanged data need not be copied to or from main memory as an intermediary step. A DMA engine can operate in accordance known DMA processes and can be implemented in either hardware or software, or both. Note that processing node 110 shown in FIG. 1 is representative of one of any number of similar processing nodes that can be coupled to controller 102 and buses 104, 106, and 130.

In a specific embodiment, multifunctional memories ("MFMs") 120 and 122 can be configured to operate independently so that one MFM can provide data to MPEA 114 during execution of at least a portion of an extended instruction, while the other MFM can be configured to receive data, for example, from TIB 130. The data that is received into the other MFM can include either configuration data or a continuous stream of input/output ("I/O") data. By providing configuration data to a MFM while an MPEA 114 is processing instructions, the time between configurations changes of the reconfigurable data paths is reduced. Processing node 110 need not wait for an instruction execution to cease before receiving such data, as is the case in most conventional programmable processors. Similarly, simultaneous receipt of I/O data into a MFM during instruction execution minimizes the waiting time for receiving I/O data into the processing node. In another specific embodiment, a controller can store initial data, such as filter coefficients, into one of multifunctional memories 120 and 122 prior to execution of extended instructions. The MFM containing the initial data then can serve as a read-only-memory ("ROM"). Also, controller 102 can be configured to save state data of an executed extended instruction from MPEA 114 so that the state data can be maintained for later reuse without storing that data at a remote location, such as either a main memory or a register file, as generally is the case with conventional processor architectures. As such, bandwidth of external buses during data reuse is preserved. In yet another embodiment, processing node 110 can also include an exchanger circuit 116 or function generator circuits 118, or both, to enhance reconfigurable data path processor performance while at least conserving reconfigurable circuit resources.

According to various embodiments of the present invention, controller 102, in whole or in part, effectuates the above-mentioned functionalities of MFMs 120 and 122 by forming different data paths within and without processing node 110. In particular, controller 102 governs the operation of DFD 112 to establish the necessary data paths for implementing each of functionality of MFMs 120 and 122. Controller 102 controls operations of processing node 110 and its data paths in at least two ways. First, controller 102 decodes extended instructions, and then generates specific control signals in response to the decoded instructions. Those control signals are applied to the components of processing node 110 to govern data path formation, timing, and other aspects of instruction execution. Second, controller provides processing node 110 with configuration data to form specific data paths in DFD 112 so that MFMs 120 and 122 perform functions commensurate to the configuration data. As shown, configuration data can be stored in configuration registers ("config.") 126. "Configuration data" refers generally to that data used to configure, for example, one or more specific input and output data paths as defined by DFD 112. Or, it is data used to configure multifunctional memories 120 and 122 to perform a specific function as defined by such configuration data. For instance, configuration data is a number of bits that represent how specific multifunctional memories are to behave.

The following few examples illustrate the role of controller 102 in providing for the different functionalities of MFMs 120 and 122. Consider that controller 102 can configure multifunctional memories 120 and 122 to operate independently so that one MFM can provide data to MPEAs 114 during instruction execution while the other MFM is receiving data, for example, from TIB 130. Controller 102 first can instruct DFD 112 (e.g., via decoded instructions or configuration data) to form a data path from multifunctional memory 120 to MPEA 114. Next, controller 102 instructs DFD 112 to form a data path from TIB 130 into multifunctional memory 122. Also, controller 102 couples TIB 130 to either a peripheral device or a source of configuration data, such as a main memory. Accordingly, MPEA 114 can execute instructions from MFM 120, for example, simultaneous to data exchanges into MFM 122 for receiving either a non-interrupted, continuous steam of I/O data, or configuration data prior to an associated configuration change.

Next, controller 102 can configure multifunctional memories 120 and 122 to form either a read-only-memory ("ROM") or as a read/write scratch pad memory for reuse of data. To implement MFMs 120 and 122 as a ROM, controller 102 first instructs DFD 112 to form a data path from either global buses 104 or 106, or from TIB 130 to the MFM targeted to function as a ROM. Once that data path is established, then controller 102 transmits initialization data, such as a read-only table containing constant data, over the data path for storage in the targeted MFM.

To implement multifunctional memories 120 and 122 as scratchpad memories to store state data, controller 102 can instruct DFD 112 to form the necessary data paths, for example, between MPEAs 114 and one of MFMs 120 and 122. As such, state data can be buffered from one phase of a computation to another phase without expending the temporal overhead of transferring the data to and from, for example, a main memory or a register file. "State data," or "state," generally represents a computation result (or a portion thereof) generated by MPEAs 114 that can be stored during, for example, the interruption of an associated instruction stream, and subsequently restored to continue the previous instruction stream using the restored state. Note that the term "data" refers to a unit of information that can operated upon by processing node 110, and that term can be used interchangeably to describe "program instructions" executed by a processor or a reconfigurable computational element (e.g., MPEA 114) and "program data" upon which the program instructions operate.

Figure 9:
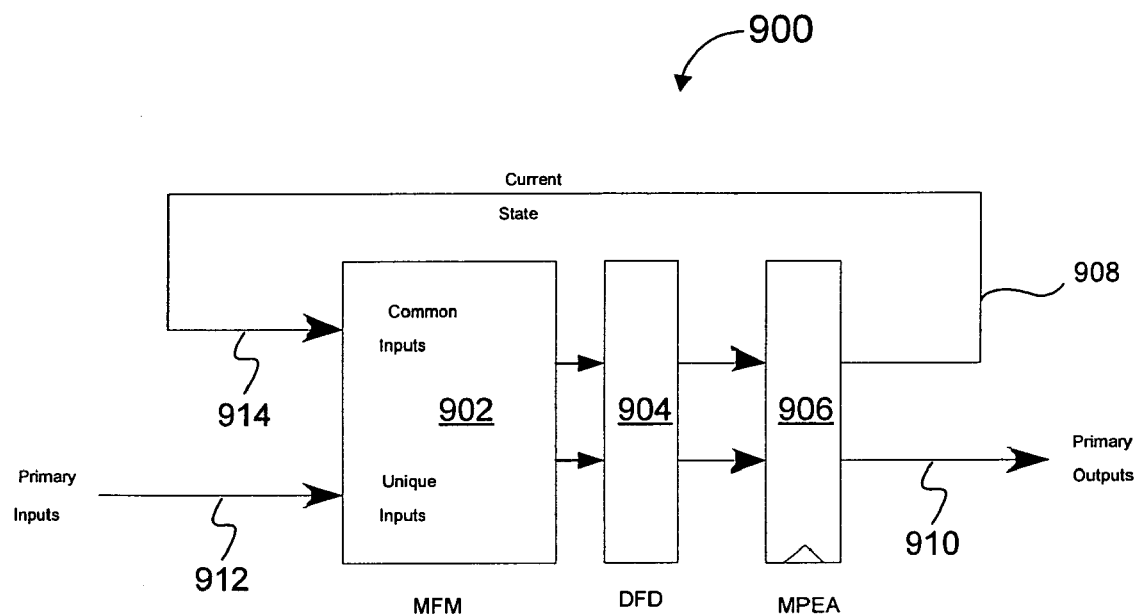
FIG. 9 depicts an exemplary application of a function generator of FIG. 8 as a finite state machine, according to one embodiment of the present invention.

To implement one of MFMs 120 and 122 as a source of multiplicands in a multiplication process, controller 102 can instruct DFD 112 to direct data read from one of multifunctional memories 120 and 122 to large scale block ("LSB") 124, which can be a multiplication block. After the multiplication block generates a result, it is routed via DFD 112 to a destination determined by controller 102. LSB 124 is a dedicated computational resource that generally includes nonconfigurable logic that is tailored to perform specific, computationally-intensive functions, such as priority encoding, discrete cosine transforms, floating point operations, etc. By using LSB 124, valuable configurable resources can be saved for performing computations. As will be discussed below, controller 102 also can be configured to instruct DFD 112 to form data paths for implementing an exchanger circuit 116 (e.g., as shown in FIGS. 6 to 7C) or function generator circuits 118 (e.g., as shown in FIG. 9), or both.

In a specific embodiment of the present invention, an example of a reconfigurable computational element suitable to implement MPEA 114 is an Arithmetic Logic Element ("ALE") as described in U.S. Pat. No. 6,633,181 B1, entitled "Multi-Scale Programmable Array." Also, data flow direction 112 can be implemented as one of the types described in U.S. patent application Ser. No. 10/746,018 entitled "Architecture and Method for Reconfigurable Data Path Processing," filed on Dec. 23, 2003, which is incorporated by reference. Further, controller 102 can be realized using an "extension fabric interface," or "EFI," also described in the same U.S. Patent Application. In at least one embodiment of the present invention, any number of MFMs 120, 122 can be embedded in processing node 110. When a single multifunctional memory is embedded, two or more address spaces can be used to mimic functionalities of MFM 120 and MFM 122.

Figure 2:
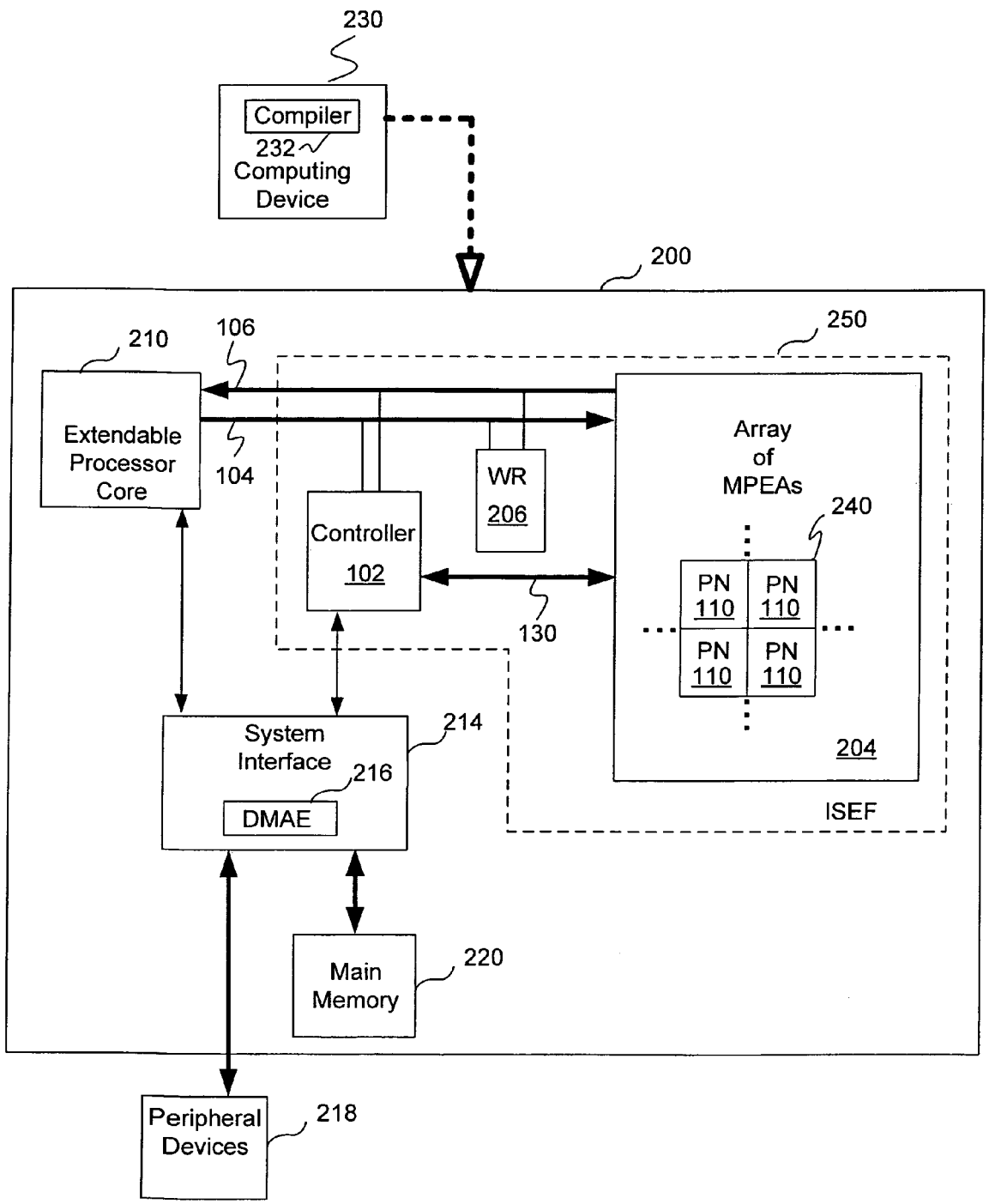
FIG. 2 illustrates a reconfigurable data path processor composed of an array of processing nodes, according to one embodiment of the present invention.

FIG. 2 illustrates a reconfigurable data path processor composed of an array of processing nodes 110, according to one embodiment of the present invention. Reconfigurable data path processor 200 includes an extendable processor core 210, an instruction set extension fabric ("ISEF") 250, a system interface 214 and a main memory 220. Extendable processor core 210 is a reduced instruction set computer, or "RISC," processor core based on a load-store architecture. Extendable processor core 210 includes an instruction cache and data cache (neither are shown) from which extended instructions (i.e., opcodes) and data (i.e., operands), respectively, are transmitted via global bus 104 into ISEF 250, with results returning via global bus 106. An "extended instruction" is a user-definable instruction that is typically formed from the compilation of a program written in a high-level language, such as "C" programming code, along with the generation of configuration data defining the architecture of the configurable resources necessary to support the execution of each of the extended instructions.

ISEF 250 can be described as a software-configurable fabric that includes an array of MPEAs 204, which is composed of a number of processing nodes 110, a controller 102 and a wide register file ("WR") 206. In one embodiment, WR 206 can be organized as a single file of 32 registers by 128 bits, and can support three concurrent read operations and two concurrent write operations, as an example. Note that the four processing nodes 110 shown in FIG. 2 form a "Timpani Processing Node" 240 as is described in U.S. patent application Ser. No. 10/746,018, according to a specific embodiment of the present invention. Controller 102, a portion of which is shown in FIG. 1, serves as an interface among extendable processor core 210, a system interface 214, and array of MPEAs 204. Specifically, controller 102 bridges system interface 214 and TIB bus 130.

System interface 214 is configured to interface extendable processor core 210 and ISEF 250 with peripheral devices 218, main memory 220 and other entities external to ISEF 250. As shown, system interface 214 includes one or more direct memory access ("DMA") engines 216 to exchange data between PNs 110 and main memory 220 as well as between PNs 110 and peripheral devices 218, without passing the data either through extendable processor core 210 or through a register file, such as WR 206. Accordingly, system interface 214 enables streams of I/O data and application data to be exchanged with any of multifunctional memories 120 and 122 of PNs 110, especially when those PNs 110 are performing computations.

Computing device 230 is a computing device composed of a central processing unit, a memory, an operating system and a number of application programs, one of which is compiler 232. Compiler 232 is configured to analyze compute-intensive portions of C/C++ application software to identify computationally-intensive code segments. Having identified those segments, the compiler then converts the code embodied in them to generate configuration data so that controller 102 can configure PNs 110 as well as the data paths thereof. In particular, compiler 232 can identify and implement specific multifunctional memories to provide multiple functionalities of embedded memory in accordance with various embodiments of the present invention. Examples of multifunctional memory implementations are depicted in the following FIGS. 3 to 9. Note that although the depiction of controller 102 is omitted so as not to obscure the discussion of these figures, controller 102 establishes the data paths for the examples shown in FIGS. 3 to 9.

Figure 3:
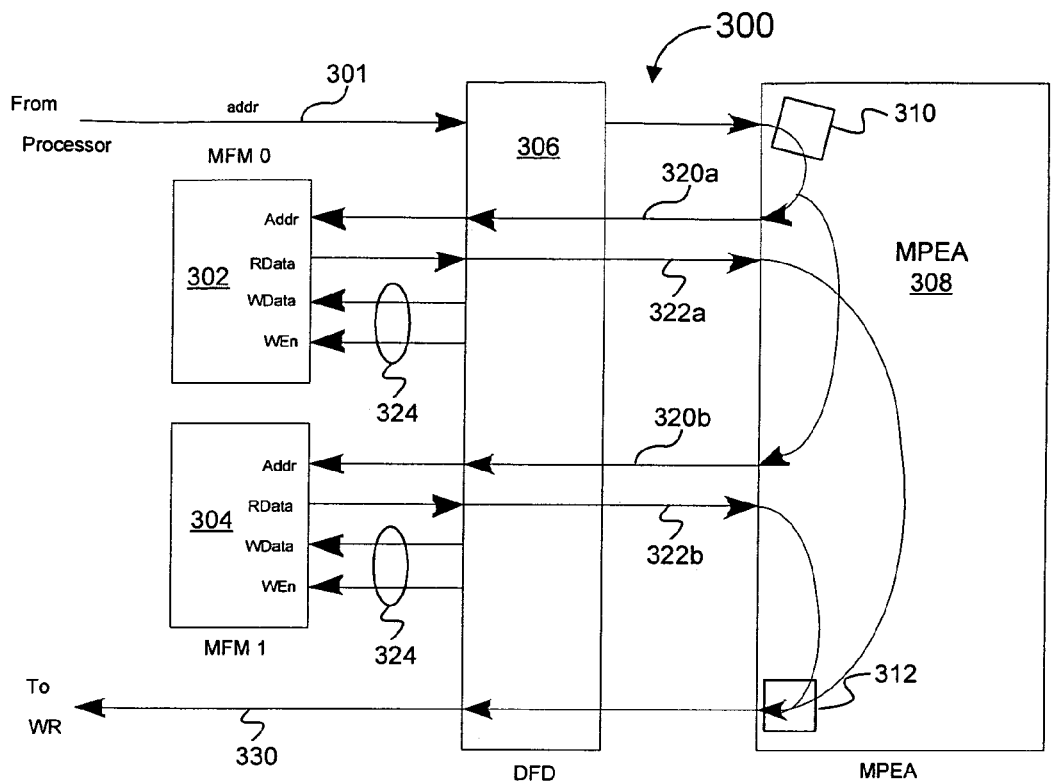
FIG. 3 depicts an example of multifunctional memories being implemented collectively as a read only memory ("ROM"), according to one embodiment of the present invention.

FIG. 3 depicts an example of multifunctional memories being implemented collectively as a read only memory ("ROM"), according to one embodiment of the present invention. Generally, controller 102 can be configured to instruct DFD 306 to form a data path to facilitate storage of initial data in multifunctional memories. Prior to execution of extended instructions (e.g., such run-time of an application executing in a reconfigurable data path processor (not shown)), multifunctional memories ("MFM 0") 302 and ("MFM 1") 304 are configured to receive data in a particular word size and then are initialized to include data. With regard to word size, consider that in this instance multifunctional memories ("MFM 0") 302 and ("MFM 1") 304 each are 64-word by 32-bit random access memory. Although a compiler, such as compiler 232 (FIG. 2), can configure MFMs 302 and 304 to operate as either a 256-word by 8-bit ROM or a 128-word by 16-bit ROM, wider and/or deeper ROM structures can be constructed by consolidating multiple MFMs. For example, Table I is a statement declaring a read-only table "table32[ ]" as including data being 32 bits wide.

TABLE I static se_uint<32 > table32[ ] = {15, 0, 1, 9, 3, 11, 5, 6, 7, 8, 2, 10, 4, 12, 13, 14};

The compiler can decompose the data in table32[ ] into two 16-bit portions, and then can initialize the multifunctional memories as a ROM by storing a first and a second 16-bit portion in MFM 302 and MFM 304, respectively.

Next, consider that the MFMs 302 and 304 operate as one or more ROMs as an application program executes (i.e., during run-time). Further to the previous example, an extension instruction "rom_read," when executed, indexes into table32[ ] and reads the contents of a ROM, where Table II illustrates an example of such an extension instruction.

TABLE II

SE_FUNC void rom_read(SE_INST RDROM, int addr, WR *out)
  { se_uint<32> val;
    val = table32[addr]; /* read 32-bit value from table
for address "Addr"*/
    *out = (WR)val; /* load wide register file with 32-bit
value*/
  }

FIG. 3 shows that extendable processor core 210 (not shown) transmits address ("addr") 301 into a processing node 300, and in particular, DFD 306. The data path routing of DFD 306 can be set by either configuration data bits or the decoded instruction, or both, as determined by controller 102 (FIG. 1). Address 301 passes into decomposition logic 310 of MPEA 308, whereby the 32-bit address is decomposed into address portions 320*a* and 320*b* to access respective MFMs 302 and 304. Contents of address 301 are read as data 322*a* and 322*b*, both of which are transmitted into concatenation logic 312 to form 32-bit wide read data. Thereafter, read data 330 representing a "value" is passed, for example, to wide register file 206. Note that during ROM operations, write enable ("WEn") and write data ("Wdata") signals 324 are ignored, as MFMs 302 and 304 are ROMs. Signals 324, however, are used to implement those multifunctional memories as read/write scratch pads, as is discussed next.

Most of the principles discussed above in implementing MFMs 302 and 304, as ROMs, are applicable to implementing MFMs 302 and 304 as read/write scratch pads. These scratch pads enable a reconfigurable data path processor to store state data of an executed extended instruction from MPEA 308, such that the state data can be maintained and then reused in processing node 300 rather than storing that data in either a main memory or a register file, as generally is the case in accordance with conventional processor architectures. As such, bandwidth of external buses during data reuse is preserved. In specific embodiments of the present invention, read/write scratchpad memories formed from MFMs 302 and 304 are considered a form of processor state (i.e., "state data"). That is, MFMs 302 and 304 functioning as read/write scratchpads can be read and written during execution of extension instructions, with their contents being preserved across context switches (i.e., configuration changes affecting processor node 300). Typically, controller 102 restricts access to these scratchpads to insure sequential consistency.

Next, consider an example of several multifunctional memories of at least eight processing nodes 110 being used to provide read/write scratchpad memory during execution of extended instructions, examples of which are shown in the code snippet of Table III. As several MFMs banks can be grouped together to form wider and/or deeper memory structures, the address, write enable and data signals can be routed among appropriate data flow directors over any number of processing nodes 110. The code snipped in Table III uses two extension instructions (e.g., "COMPUTE_HIST" and "MERGE_HIST") and 16 MFM-based read-write scratchpads to compute a histogram of the brightness of a stream of 8-bit pixels. In particular, compiler 232 configures 16 multifunctional memories, two of which can include MFMs 302 and 304, as read/write memories to accept 8-bit wide data (i.e., commensurate with width of pixel data). During runtime, a number of MPEAs 114 associated with the 16 multifunctional memories, such as MPEA 310, execute the COMPUTE_HIST instruction to operate on sixteen pixels at a time, with each 8-bit pixel value of each pixel being added to a corresponding entry in one of the sixteen multifunctional memories, each of which constitutes a histogram table. For example, MPEA 310 receives two 8-bit pixel data values (not shown) and reads corresponding entries out from MFMs 302 and 304. MPEA 310 computes the sum of each pixel data value and entry and writes the sum into a respective multifunctional memory. Note that controller 102 synchronizes the execution of one COMPUTE_HIST instruction so that it stalls (e.g., is pipelined) until the write from the previous COMPUTE_HIST extended instruction has completed. After all of the pixels in an image have been processed, the associated processing nodes 110 further used their MPEAs 114 to execute the MERGE_HIST instruction 256 times to finally assemble a final histogram by passing the sum of the addr element from each of the 16 multifunctional memories to WR 206.

TABLE III

```
static se_uint<16> histogram [16] [256];
                                            // Implemented in
                                            MFM blocks
SE_FUNC void hist (SE_INST COMPUTE_HIST, SE_INST
                MERGE_HIST, int addr, WR in, WR *out)
{ int i;
    se_uint<16>sum;
    if (COMPUTE_HIST) {
        for (i = 0; i < 16; i++) {
            histogram[il [integer (in(8*i+7, 8*i))] += 1;
        }
    } else if (MERGE_HIST) {
        sum = 0;
        for (i = 0; i < 16; i++) {
            sum += histogram[i] [addr];
        }
        *out = (WR)sum;
    }
}
```

Figure 4:
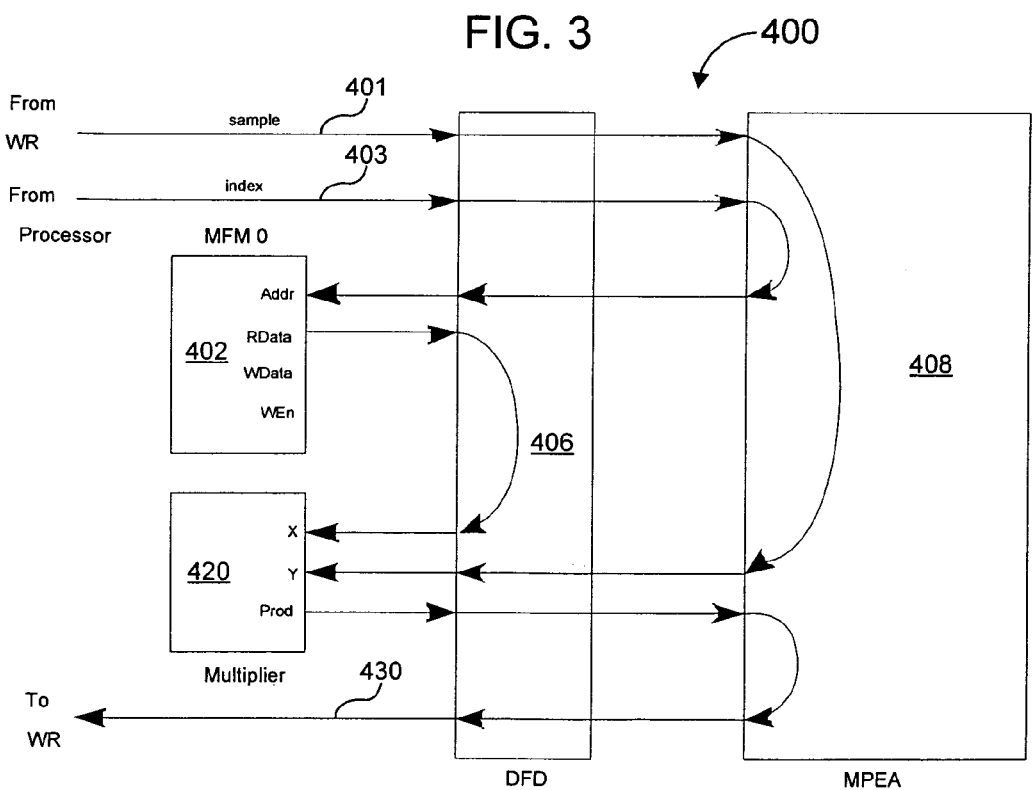
FIG. 4 depicts an example of a multifunctional memory being implemented as a source of multiplicands as an input into a multiplier block, according to a specific embodiment of the present invention.

FIG. 4 depicts an example of a multifunctional memory being implemented as a source of multiplicands as an input into a multiplier block, according to a specific embodiment of the present invention. In processing node 400, multifunctional memory ("MFM 0") 402 has been initialized to include data, such as an array of data representing filter coefficients. Multiplier block 420 constitutes LSB 124 of processing node 400, and is used to perform efficient multiplication operations without consuming reconfigurable data path routing resources. In operation, a sample value ("sample") 401 and an index value ("index") 403 are received via DFD 406 into MPEA 408 from a wide register file and a processor, respectively. Next, MPEA 408 applies index 403 as address to MFM 402 and sends sample 401, as the multiplier, to multiplier block 420. The multiplicand is read from MFM 402 into multiplier block 420. Thereafter, data representing product 430 of the multiplication operation is passed to the wide register file to complete instruction execution. The code snippet in Table IV illustrates the execution of the extended instruction "mult" in a fashion similarly depicted in FIG. 4.

TABLE IV

```
static se_sint<16> coeff[ ] = { 0, 37, 42, 5280,
                        -5280, -42, -37, 0 };
            //** Intialize MFM 402 to include filter coefficients
SE_FUNC void mult (SE_INST MULT, int index, WR in, WR *out)
    {
        se_sint<16>sample = in(15, 0);
                //**Fetch sample from wide register
            file
        se_sint<32 >result = sample * coeff [index];
                //**Multiple sample &coefficient
        *out = (WR)result; //**pass product to wide register file
    }
```

Figure 5A:
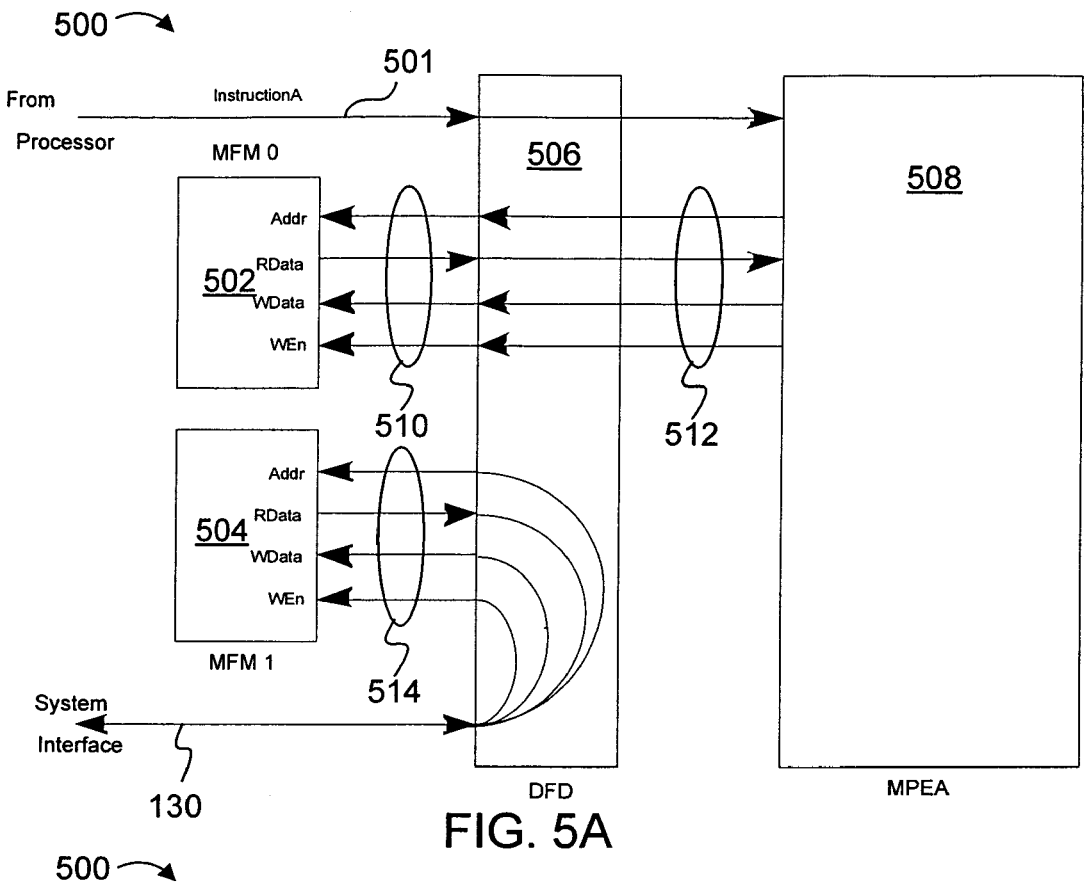
FIGS. 5A and 5B depict examples of independent operations of multifunctional memories during executing of an extended instruction, according to a specific embodiment of the present invention.
Figure 5B:
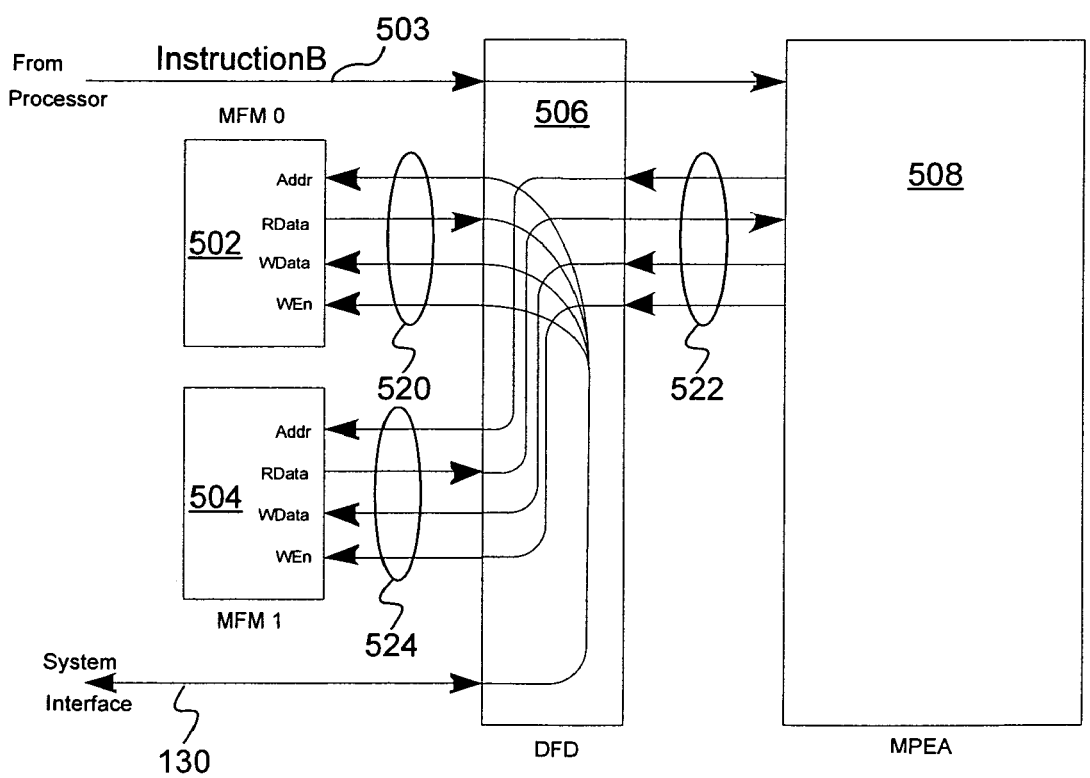

FIGS. 5A and 5B depict examples of independent operations of multifunctional memories during execution of an extended instruction, according to a specific embodiment of the present invention. As shown, one of the multifunctional memories, such as multifunctional memory 502, can be configured to provide data to MPEA 508 to execute at least a portion of an extended instruction while the other of the multifunctional memories, such as multifunctional memory 504, can be configured to receive data, for example, from TIB 130 (FIG. 1). In particular, data flow director 506 is configured to form data paths to couple inputs and outputs 512 of MPEA 508 to inputs and outputs 510 of MFM 502, whereas DFD 506 is configured to form data paths via TIB 130 between inputs and outputs 514 and system interface 214 (FIG. 2). In one instance, data communicated over TIB 130 can include configuration data to configure at least a portion of the modular processing elements in MPEA 508 during another interval of time. So by receiving configuration data into MFM 504 at the same time MPEA 508 is executing instructions and interacting with MFM 502, the time required to change configurations can be minimized for reconfiguring both data paths and computational elements in processing node 500. In another instance, the data can include a continuous stream of input/output ("I/O") data originating from a peripheral device (not shown) without transitory buffering, such as in main memory, thereby minimizing delays in providing the continuous stream of I/O data to the modular processing elements of MPEA 508. FIG. 5B depicts MFMs 502 and 504 with their functionalities swapped. That is, inputs and outputs 522 of MPEA 508 are coupled to inputs and outputs of 524, whereas DFD 506 is configured to form data paths via TIB 130 (FIG. 1) between inputs and outputs 520 and system interface 214.

Figure 6A:
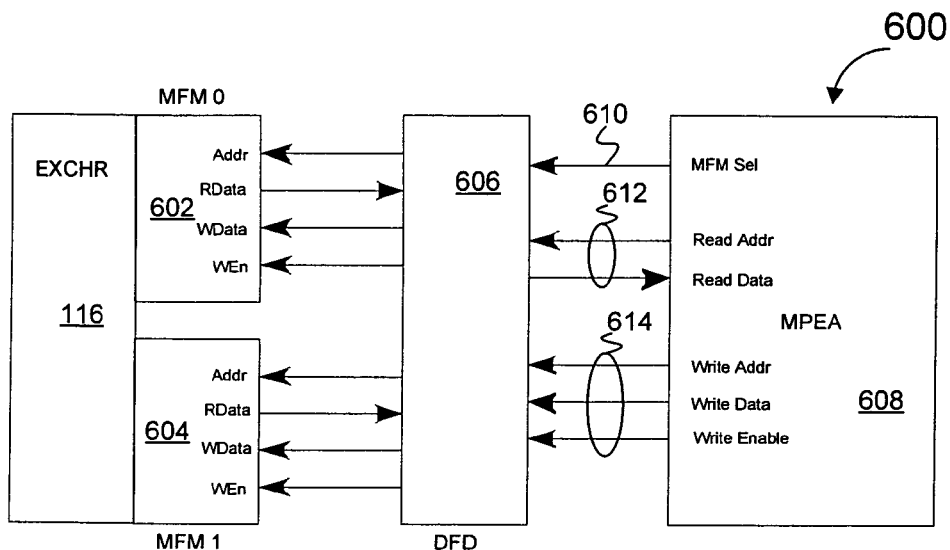
FIGS. 6A to 6C illustrate multifunctional memories operating with an exchanger circuit, according to one embodiment of the present invention.
Figure 6B:
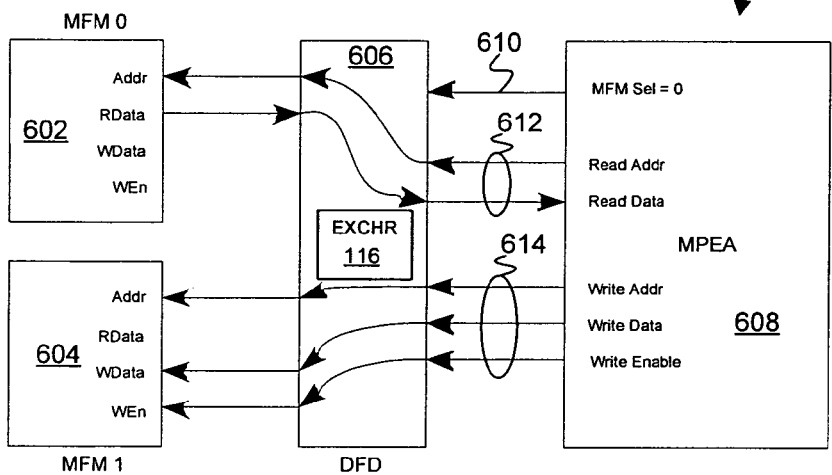
Figure 6C:
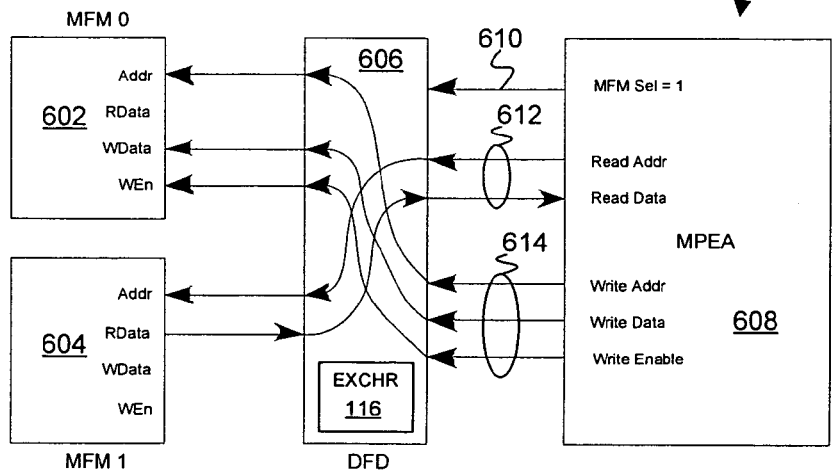
Figure 7:
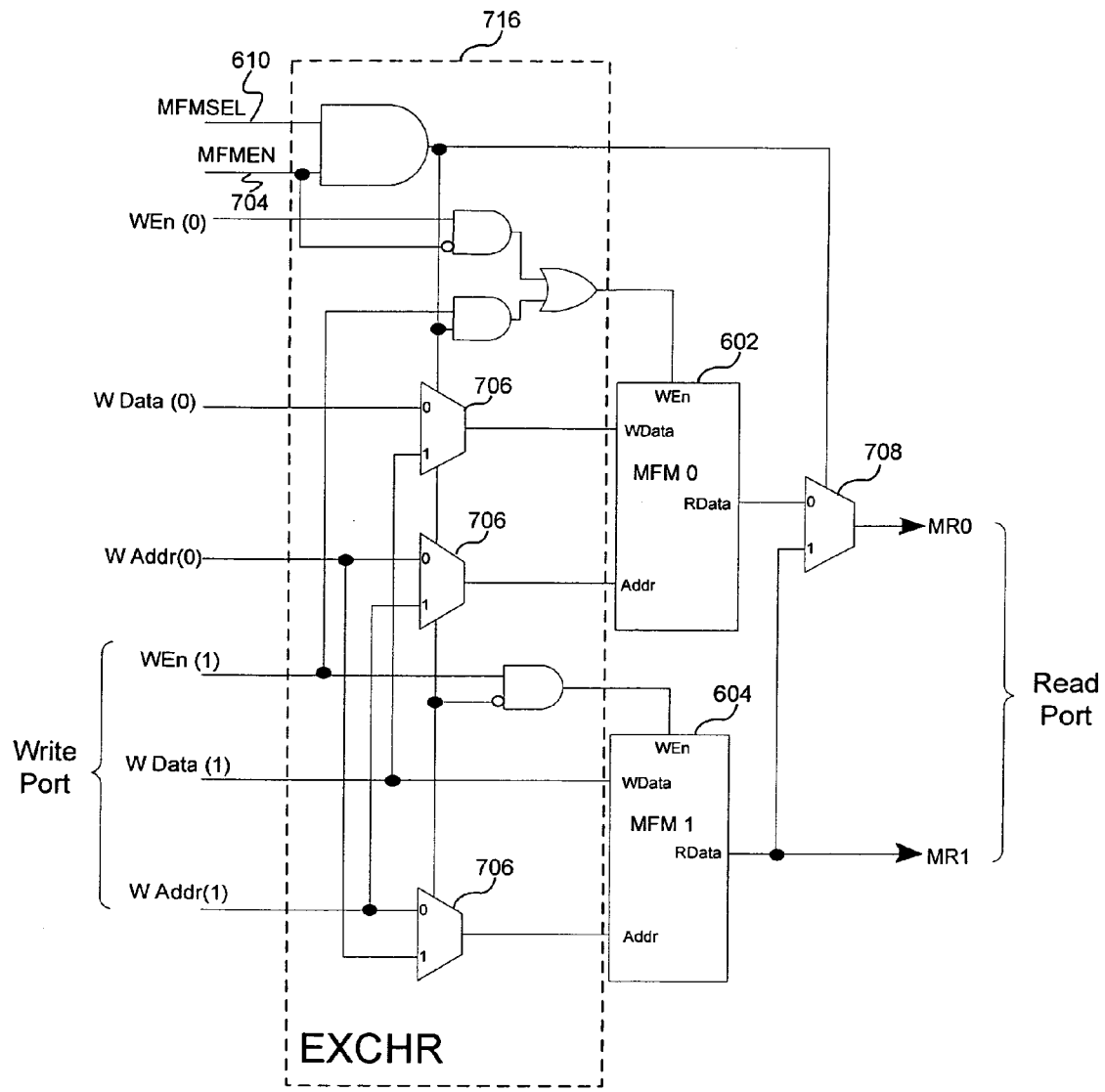
FIG. 7 is a schematic of an exemplary exchanger circuit for implementing multifunctional memories as a double buffer in accordance with one embodiment of the present invention.

FIGS. 6A to 6C illustrate multifunctional memories operating with an exchanger circuit 116, according to one embodiment of the present invention. Exchanger circuit ("EXCHR") 116 is configured to implement multifunctional memories 120 and 122 as a double buffer without synthesizing programmable logic to do so. MPEA 608 is coupled to DFD 606 to provide a MFM select signal ("MFM Sel") 601 to select which of the two MFMs is the primary buffer. Also, MPEA 608 is coupled to DFD 606 to provide its read-related signals 612 and write-related signals 614. FIG. 6A depicts a processing node 600 configured to operate as a double buffer. In particular, exchanger circuit 116 is coupled to MFM 602 and MFM 606 to govern which one of the two is a primary buffer and which one is the secondary buffer. A primary buffer is the multifunctional memory from which data generally is read, whereas a secondary buffer is the multifunctional memory to which data is generally written. For example, the primary buffer in video display applications generally contains the data representing images being displayed whereas the secondary buffer includes data that is being modified for subsequent display after the functionalities of the two buffers are swapped. In accordance with an alternative embodiment of the present invention, exchanger circuit 116 is disposed in DFD 606 in FIGS. 6B and 6C. As shown in FIG. 6B, MPEA 608 uses MFM Sel 610 to select MFM ("0") 602 as the primary buffer. As such, read-related signals 612 are coupled to MFM 602 and write-related signals 614 are coupled to MFM 604. FIG. 6C shows the functionalities of MFMs 602 and 604 being swapped.

FIG. 7 is a schematic of an exemplary exchanger circuit to implement multifunctional memories as a double buffer in accordance with one embodiment of the present invention. Controller 102 (FIG. 1), for example, can provide a configuration bit as MFM enable signal ("MFMEN") 704 to control whether exchanger circuit 716 is enabled. When MFMEN 704 is equal to zero the two MFMs behave independently. When MFMEN 704 is equal to one, MFMs 602 and 604 behave as a coordinated double buffer such that during any given clock cycle, a read operation can access one multifunctional memory and a write operation can access the other. MPEA 608 of FIGS. 6A to 6C computes MFM Sel 610 as a result of executing an extended instruction. Multiplexers 706 of exchanger circuit 716 are disposed within the write address paths ("W Addr(1)" and "W Addr(0)") and write data paths ("W Data (1)" and "W Data (0)") for both MFMs 602 and 604, and multiplexer 708 is disposed within the read data path from MFM ("0") 602. The path normally associated with writes to MFM ("1") 604 (e.g., WEn (1), W Data (1), and W Addr(1)) forms a "write port" to the double buffer, while the path normally associated with reads from MFM ("0") 602 (e.g., W Addr(0), MR0) forms a "read port." When MFM Sel 610 is equal to 0, data on the write path "W Data (1)" of MFM 604 is written to MFM 604 while data read ("Rdata") from MFM 604 is gated to read port output, MR0. But when MFM Sel 610 is equal to 1, data on the write path "W Data (1)" of MFM 604 is written to MFM 602 while data read from bank 1 appears on the bank 0 output path.

Figure 8:
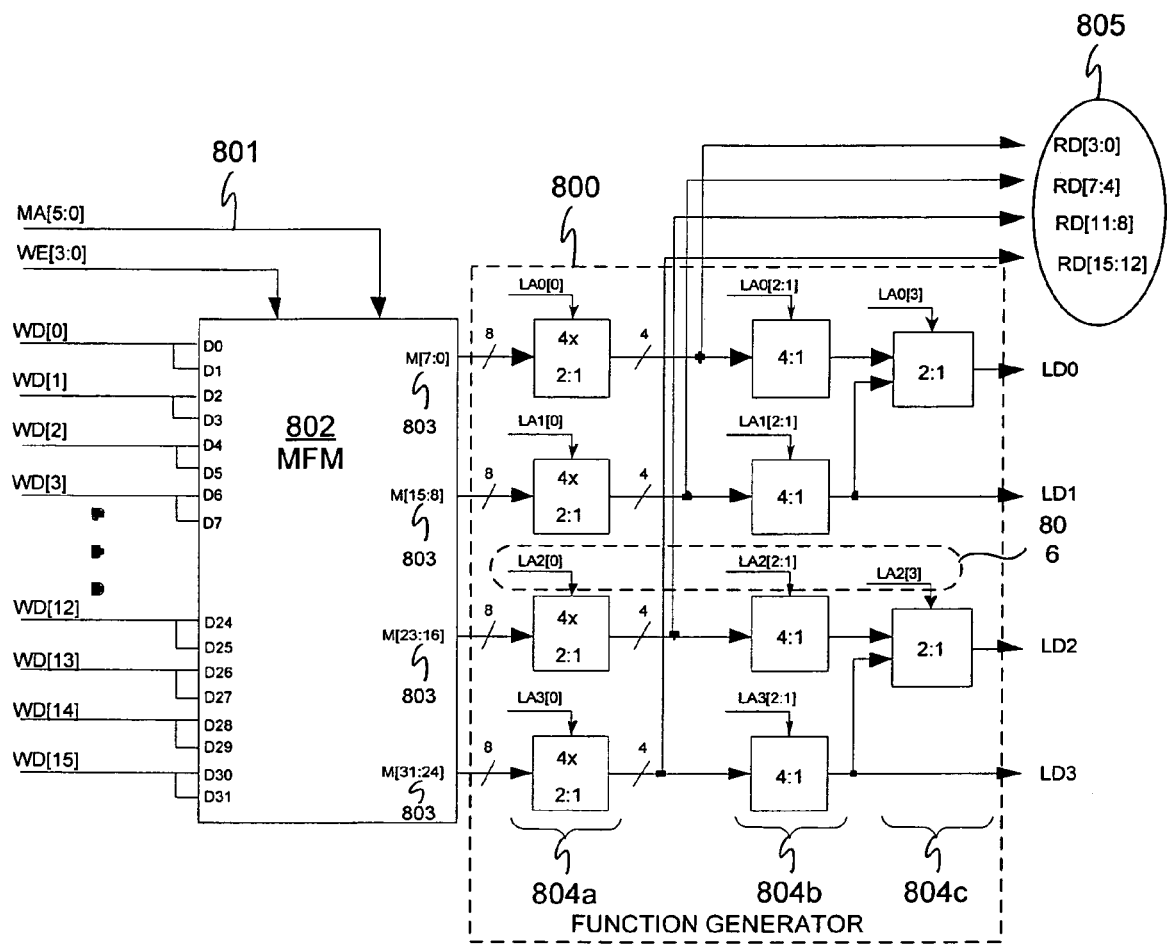
FIG. 8 is a schematic of an exemplary function generator circuit for implementing wide Boolean functions using multifunctional memories, according to one embodiment of the present invention.

FIG. 8 is a schematic of an exemplary function generator circuit to implement wide Boolean functions using multifunctional memories, according to one embodiment of the present invention. Function generator circuit 800 is configured to compute a function output based on a number of wide Boolean functions (e.g., 9 or 10 variables) from at least one of the least one of multifunctional memories, such as MFM 802, a common number of variables associated with the number of Boolean functions, and additional number of unique variables. Accordingly, multifunctional memory 802 providing the Boolean functions can be configured to implement perform a look-up table ("LUT") function to replace a relatively large number of LUTs that are typically unwieldy in implementing wide Boolean functions, as is the case with most conventional LUT-based Boolean functions. In one embodiment, a single multifunctional memory configured as a LUT can replace a large numbers of conventional LUTs As shown in FIG. 8, a multifunctional memory ("MFM") 802 is configured to provide LUT functionalities. Generally, MFM 802 can be initialized prior to run-time to include LUT information (or a truth table) for providing wide Boolean functions via outputs 803. Function generator 800 includes subsets 804a, 804b and 804c of multiplexers for generating a varying numbers of Boolean functions and associated variables. Each input Lx[0], Lx[2:1], and Lx[3] into respective subsets 804a, 804b and 804c of multiplexers represents a unique variable that is additional to the 6 common variables associated with function generator. For example, the 6 bits of MA[5:0] represents common variables 801. In the example shown in FIG. 8, function generator uses the 6 common variables to implement either two wide Boolean functions (i.e., LD1 and LD3) of up to 10 variables, or four wide Boolean functions (i.e., LD0 to LD3) of up to 9 variables. Function generator 800 operates in two modes: non-LUT mode and LUT mode. If not in LUT mode, inputs LA0[0], LA1[0], LA2[0], LA3[0] are set to configure subset of multiplexers 804a to gate data from outputs 803 to outputs 805 so that data can be used as read data. But if in function generator 800 is in LUT-mode, then bits Lx[0], Lx[2:1], and Lx[3] select the number of Boolean functions and variables. For example, LA1 is set equal to LA0[2:0], and LA3 is set equal to LA2[2:0] to implement two functions of 10. Note that function generator 800 is an example of one configuration for using multifunctional memories to implement complex Boolean functions and that various other configurations are within the scope and spirit of the present invention. For example, fewer or more subsets of multiplexers 804 can be implemented to vary the number modes available. As another example, function generator 800 can be adapted to receive outputs 803 from two or more multifunctional memories. For instance, an exemplary function generator can generate any combinations from 16 functions of 8 variables (e.g., 8 common variables, 0 unique variables) to 1 function of 14 variables (e.g., 8 common, 6 unique).

FIG. 9 depicts an exemplary application of function generator 800 as a finite state machine, according to one embodiment of the present invention. Here, a multifunctional memory 902 includes a function generator 800 (not shown) to form a finite state machine. As such, finite state machine 900 includes one or more multifunctional memories that can be configured to include data representing a state transition table for a number of complex (i.e., wide) Boolean functions. With such a state transition table, finite state machine 900 determines a next state based on a previous state as well as common and unique variables as inputs. In operation, multifunctional memory 902 generates Boolean function outputs that are passed via DFD 904 to MPEA 906. MPEA 906 then performs computations using the Boolean function outputs. Then, common variables 908 are fed back as the previous state into the common inputs of MFM 902. Primary outputs 910 are a function of both primary inputs 912 and common inputs 914.

Figure 10:
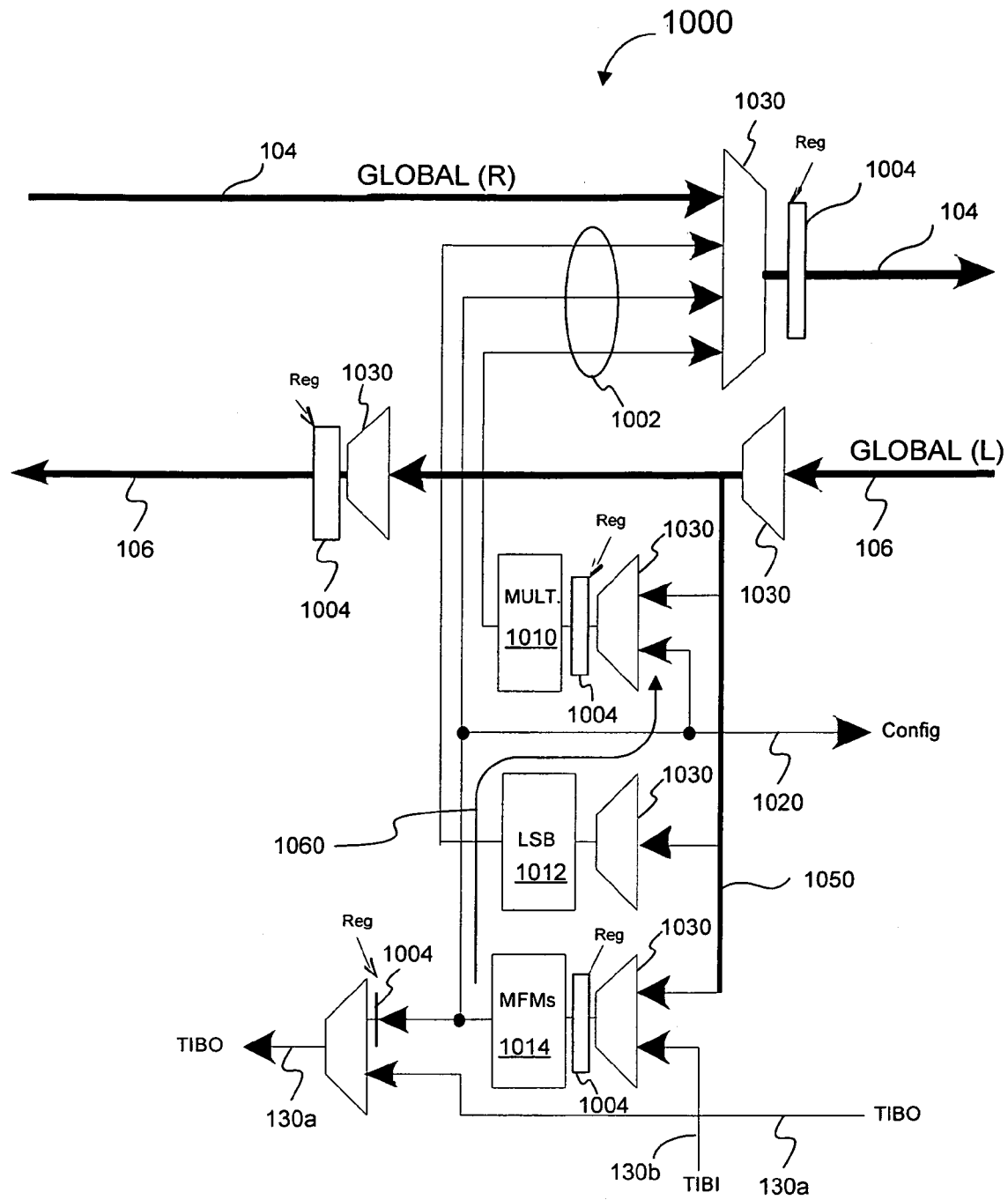
FIG. 10 depicts an exemplary data flow director for forming reconfigurable data paths to implement multifunctional memories in accordance with a specific embodiment of the present invention.

FIG. 10 depicts an exemplary data flow director for forming reconfigurable data paths to implement multifunctional memories in accordance with a specific embodiment of the present invention. Data flow director ("DFD") 1000 includes a number of multiplexers 1030 and programmable pipeline registers ("Reg") 1004, both of which can be configured by controller 102 (e.g., configuration bits and/or decoded instructions). Generally, global bus 104 of DFD 1000 supports a basic left-to-right flow to move data from the processing node, wide register file or controller to the left of DFD 1000. Also, global bus 104 supports a flow 1002 of data from multiplication block ("MULT.") 1010, LSBs 1012 and MFMs 1014. Global bus 106 generally supports a right-to-left flow to move data from the processing node containing DFD 1000 to multiplication block ("MULT.") 1010, LSBs 1012 and MFMs 1014 to the left of DFD 1000, as well as to the processing node, wide register file or controller. Note that addresses and write data from an MPEA in the same processing node as DFD 1000 are routed over global bus 106 via path 1050 to MFMs 1014. The output of MFMs 1014 can be routed via path 1060 to the input of MULT. 1010, or alternatively, out via flow 1002 to the MPEA, for example. Further note that TIB 130 of FIG. 1 includes an input TIB 130b and an output TIB 130b. Configuration data stored for example in MFMs 1014 can be introduced into respective configuration registers via configuration path ("Config") 1020.

Figure 11:
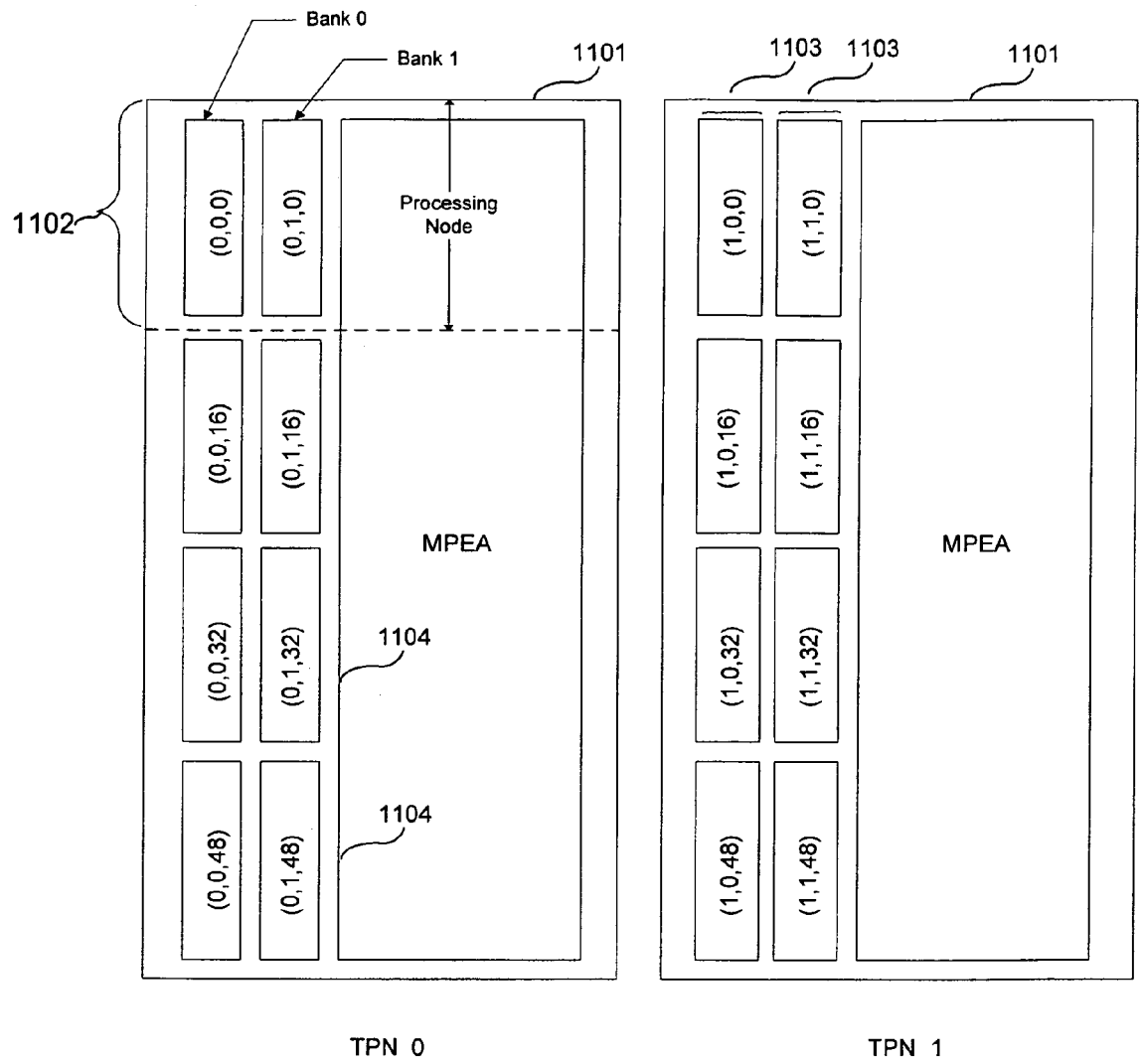
Figures 12A, 12D:
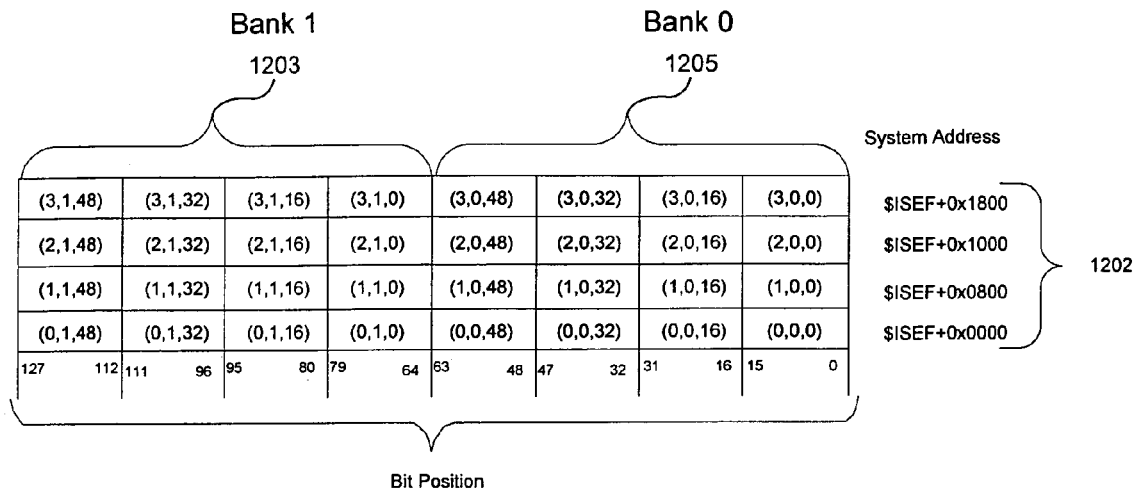

FIGS. 11 to 12D illustrate a labeling scheme for representing data stored in multifunctional memories in a manner recognizable by processing nodes and their computational resources, according to a specific embodiment of the present invention. Specifically, controller 102 (FIG. 2) can be configured to use a coordinate triple (TPN #, Bank #, Quadrant) to refer one or more MFMs in an ISEF 250 where "TPN #" is the number of TPN 1101 within the ISEF (not shown), "Bank #" is the bank number 1103 within the TPN (e.g., bank 0 or bank 1), and "Quadrant" is the Y coordinate of the top row of the quadrant (0, 16, 32, or 48). A TPN, or Timpani Processing node 1101, includes four processing nodes 1102, where each processing node 1102 is equivalent to a "quadrant."

Controller 102 generally supports reading and writing MFMs from system interface 214 in several different "views," such as either 16-bit, 32-bit, 64-bit and 128-bit views, as viewed by an extension instruction in one or more processing nodes 1102. As data originating from system interface 214 can be in various word sizes, controller 102 uses this labeling scheme so that the computational resources can use the data from system interface 214.

FIG. 12A depicts a 128-bit address map, according to at least one embodiment. In the 128-bit view, all eight MFMs banks 1203, 1205 in a TPN 1101 are grouped together to form a single 128-word by 128-bit memory. System addresses 1202 are shown relative to a base pointer, $ISEF. FIG. 12B depicts a 16-bit address map, according to at least one embodiment. In the 16-bit view, each MFM 1103 in FIG. 11 appears in the system address space as a contiguous block of 16-bit values. As such, each of the eight MFMs 1104 in TPN 1101 can be ordered sequentially to form a 1024×16 bit memory. Transactions of more than 16 bits can be decomposed into multiple 16-bit transactions by controller 102. FIG. 12C depicts a 32-bit address map, according to at least one embodiment. In the 32-bit view, MFMs 1104 in adjacent quadrants 1102 are paired to appear in a system address space as a contiguous block of 32-bit values. The four MFM 1104 pairs in TPN 1101 can be ordered sequentially to form a 512×32 bit memory. Note that transactions of more than 32 bits can be decomposed into multiple 32-bit transactions by controller 102. FIG. 12D depicts a 64-bit address map, according to at least one embodiment. In the 64-bit view, four MFMs 1104 are grouped to appear in the system address space as a contiguous block of 64-bit values. In particular, the two bank groups in TPN 1101 can be ordered sequentially to form a 256×64 bit memory. Transactions of more than 64 bits can be decomposed into multiple 64-bit transactions by controller 102.

Figure 13:
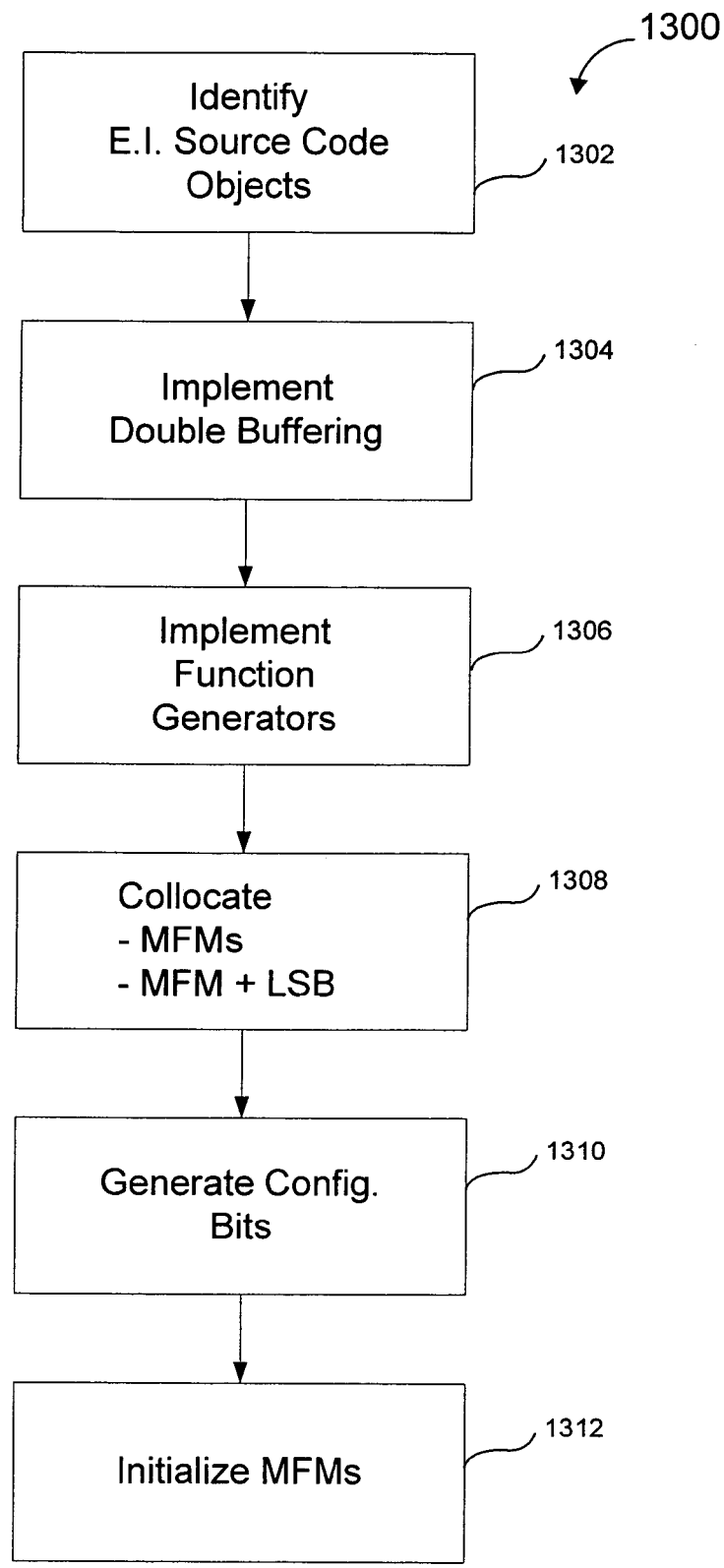
FIG. 13 is an exemplary flow chart depicting a method for operating a compiler, according to one embodiment of a method of the present invention.

FIG. 13 is an exemplary flow 1300 for operating a compiler, according to one embodiment of the present invention. As an example, the compiler can be composed of the following modules: a code generator module, a technology mapper module, a place and route module, and a bit streamer module, any of which can be implemented in either hardware or software, or both. In 1302, the complier identifies extended instruction ("EI") source code objects that require mapping into multifunctional memories. Also in 1302, the code generator module determines a configuration mode and a number of MFMs required for each memory object. The mode can be either read-only or read-write, for example, depending on whether the EI includes code to write the memory. If the width of the memory object has been declared to be less than or equal to 8 bits, the code generator will configure the MFMs into which the object will map in 8-bit mode. Otherwise, 16-bit mode is used. But if the width is greater than 16 bits, then code generator can allocate multiple MFMs for that one memory object. Note that if the depth is greater than 128 (in 16-bit mode) or 256 (in 8-bit mode), then the code generator module will allocate multiple banks and add multiplexers to construct a single memory. The code generator can also combine multiple memory objects into a single MFM or set of MFMs if it can be determined at compile time that the memory objects are temporally disjoint.

At 1304, the code generator module can identify opportunities to implement double buffering by analyzing the structure of the source code. If implementing, the appropriate configuration bits are set and logic to control the bank select signal is synthesized. As such, the compiler is able to recognize this construct and place buffer pairs together in the same processing node.

At 1306, the technology mapper module identifies and exploits opportunities to use one or more MFMs to implement wide Boolean functions. So long as a specific MFM is not used to cache configuration data, and if an MFM is identified as being unused, then the technology mapper module will attempt to implement a function generator with an MFM. For example, after random functions (i.e., non-data path oriented functions) are identified, then the technology mapper can order them by size and commonality of input variable set and pack those functions with up to six common variables into the same MFM.

Next at 1308, the place and route module allocates physical resources to each of the objects produced by the technology mapper module according to a set of optimality criteria. First, the place and route module: (1) collocates related MFM banks that implement a single memory object, and (2) collocates MFMs that directly feed multiplier blocks or other LSBs. Then, the place and route module optimally places logic near to the related MFM banks, such as address generation, write enable and bank select to minimize resource usage and routing delays. In particular, the compiler will automatically decompose larger data tables into multiple MFMs and arrange their placement to share addressing and minimize routing.

At 1310, the bit streamer module constructs the configuration bits necessary for controlling the behavior of the MFMs. At 1312, if a memory object declaration includes initial contents, then those contents are arranged to initialize, for example, a table in a ROM.

Various structures and methods for designing and manufacturing integrated circuits, such as reconfigurable data path processors, are described herein. The methods can be governed by or include software processes, for example, as part of a design tool kit. Generally, such a tool kit includes computer readable medium that enables electronic device designers to design, develop and manufacture ICs in accordance with the present invention. In one embodiment, a place and route software program embedded in a computer readable medium contains instructions for execution on a computer to implement various functions of multifunctional memories, according to the present invention. Further the embodiments described herein are applicable to any technology used to implement reconfigurable processors, including Complex Programmable Logic Devices ("CPLDs"), Field Programmable Gate Arrays ("FPGAs"), and Reconfigurable Processing Arrays ("RPAs"), all of which are examples of integrated circuits that are composed of reconfigurable logic arrays on one or more semiconductor substrates.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that nomenclature selected herein is presented to teach certain aspects of the present invention and is not intended to restrict the implementations of the various embodiments. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A processing node for executing extended instructions in a reconfigurable data path processor, the processing node comprising:
    a modular processing element including a reconfigurable circuit configured to perform a computation associated with an extended instruction, the modular processing element configured to define state data associated with the extended instruction;
    a set of multifunctional memories including a first multifunctional memory and a second multifunctional memory, the reconfigurable circuit configured to define an index into the set of multifunctional memories; and
    a data flow director configured to selectably couple via a reconfigurable path the first multifunctional memory and the second multifunctional memory to the modular processing element, the state data being transferred from the modular processing element to at least one of the first multifunctional memory or the second multifunctional memory via the reconfigurable path and based on the index, at least one of the first multifunctional memory or the second multifunctional memory being configured to operate as a Boolean function memory during a first period of time and configured to operate as a read/write scratch pad memory during a second period of time different from the first period of time,
    the data flow director configured to simultaneously route data from the first multifunctional memory and route data into the second multifunctional memory while the computation is being performed.

2. The processing node of claim 1 wherein the data routed into the second multifunctional memory includes configuration data used to configure at least a portion of the modular processing element during the computation associated with the extended instruction.

3. The processing node of claim 1 wherein the data routed into the second multifunctional memory includes a continuous stream of data originating from a peripheral device.

4. The processing node of claim 3 wherein the continuous stream of data is routed over a data path to the modular processing element without being buffered at a main memory coupled to and disposed outside of the processing node.

5. The processing node of claim 4 further comprising:
    a bus coupled to the processing node for implementing at least a portion of the data path; and
    a direct memory access ("DMA") engine configured to couple the bus to an external entity, the continuous stream of data including input/output ("I/O") data.

6. The processing node of claim 2 further comprising a controller coupled to the data flow director and defining a plurality of data paths based on at least one of the configuration data or a decoded instruction.

7. The processing node of claim 1 further comprising:
    a controller configured to store initial data in a third multifunctional memory from the set of multifunctional memories prior to run time of an application associated with the extended instruction, and
    the controller configured to trigger the transfer of the state data from the modular processing element, thereby maintaining the state data in the processing node rather than either a main memory coupled to and disposed outside of the processing node or a register file during reuse of the state data.

8. The processing node of claim 1 wherein the state data is stored at the at least one of the first multifunctional memory or the second multifunctional memory during a change in configuration of the modular processing element.

9. The processing node of claim 1 further comprising:
    an exchanger circuit configured to be coupled to the first multifunctional memory and the second multifunctional memory such that the first multifunctional memory and the second multifunctional memory form a double buffer circuit.

10. The processing node of claim 9 wherein said exchanger circuit further comprises circuitry other than programmable circuits to preserve reconfigurable circuit resources.

11. The processing node of claim 9 wherein the exchanger circuit is further configured to change from a first configuration to a second configuration during a clock cycle such that the first multifunctional memory changes from a read buffer to a write buffer and the second multifunctional memory changes from a write buffer to a read buffer.

12. The processing node of claim 1 further comprising a function generator circuit configured to receive data representing a number of Boolean functions having a common number of variables associated with at least one of the set of multifunctional memories and data representing inputs selecting a number of unique variables, said function generator circuit configured to compute a function output based on said common number and said unique number of variables, the at least one multifunctional memory from the set of multifunctional memories during a specified interval of time is a single look-up table ("LUT").

13. The processing node of claim 12 wherein said function generator circuit further comprises subsets of multiplexers, each of said subsets operates in accordance with at least one of said unique variables.

14. The processing node of claim 12 wherein said function generator circuit further comprises circuitry other than programmable circuits to preserve reconfigurable circuit resources.

15. A processing node for executing an extended instruction in a reconfigurable data path processor, the processing node comprising:
 a plurality of modular processing elements;
 a multifunctional memory having a first memory portion and a second memory portion;
 a data flow director configured to selectably couple said first memory portion and said second memory portion to a modular processing element from the plurality of modular processing elements, the modular processing element having a reconfigurable circuit configured to perform a computation associated with an extended instruction, the reconfigurable circuit of the modular processing element configured to define an address value associated with a location in the multifunctional memory, at least one of the first memory portion or the second memory portion being configured to operate as a Boolean function memory during a first period of time and configured to operate as a read/write scratch pad memory during a second period of time different from the first period of time; and
 an exchanger circuit configured to couple said first memory portion and said second memory portion such that a double buffer is formed.

16. The processing node of claim 15 further comprising a function generator circuit configured to compute a function output at a point in time.

17. The processing node of claim 16 further comprising a large scale block ("LSB") circuit configured to implement a function circuit configured to operate at another point in time on data routed via said data flow director from any one of said first and said second memory portions.

18. The processing node of claim 17 wherein said exchanger circuit, said function generator circuit, and said large scale block further comprise circuitry other than programmable circuits to preserve reconfigurable circuit resources.

19. The processing node of claim 15 further comprising a controller coupled to said data flow director to form data paths according to either configuration data or a decoded instruction, or both.

20. The processing node of claim 19 wherein said controller is configured to route data out from said first memory portion at yet another point in time simultaneously with data being routed into said second memory portion when said modular processing elements are executing at least a portion of said extended instruction.

21. The processing node of claim 20 wherein the data routed into said second memory portion includes either configuration data or a continuous stream of input/output ("I/O") data originating from a peripheral device.

22. A method of implementing multifunctional memories disposed in a reconfigurable data path processor comprising:
 establishing a first data path from a first multifunctional memory ("MFM") to an array of modular processing elements ("MPEA"), said first data path configured to convey data during execution of an instruction at a portion of the array of modular processing elements;
 establishing a second data path to a second MFM from an external data source, at least one of the first MFM or the second MFM being configured to operate as a Boolean function memory during a first period of time and configured to operate as a read/write scratch pad memory during a second period of time different from the first period of time; and
 transferring data via the second data path to a location within the second MFM simultaneous to execution of said instruction, the location within the second MFM being determined at a reconfigurable logical portion of the array of the modular processing elements, the first MFM configured to store state data associated with a state of the portion of the array of modular processing elements in response to execution of the instruction being interrupted.

23. The method of claim 22 further comprising writing data into said second MFM, wherein said data is either configuration data or input/output ("I/O") data from a peripheral device, or both.

24. The method of claim 22 further comprising:
 identifying a third MFM as a read-only memory, or ROM; and
 initializing said third MFM with initial data.

25. The method of claim 24 further comprising:
 storing a truth table in a fourth MFM as a look-up table ("LUT");
 coupling subsets of multiplexers to receive an output from said fourth MFM;
 applying inputs to said fourth MFM and inputs to said subsets of multiplexers; and
 generating a Boolean function output.

26. A method of implementing multifunctional memories disposed in a reconfigurable data path processor comprising:
 performing computations in reconfigurable circuits of modular processing elements to execute an extended instruction;
 coupling a first multifunctional memory to at least a portion of said modular processing elements such that a first data can be transferred between the modular processing elements and the first multifunctional memory, the reconfigurable circuits of the modular processing elements configured to define an address value representing a location in the first multifunctional memory;
 coupling a second multifunctional memory to a bus such that a second data can be exchanged between said second multifunctional memory and an external entity simultaneous to performing said computations during an interval of time, at least one of the first multifunctional memory or the second multifunctional memory being configured to operate as a Boolean function memory during a first period of time and configured to operate as a read/write scratch pad memory during a second period of time different from the first period of time; and
 storing state data of said extended instruction from any of said modular processing elements, thereby maintaining said state data in a processing node rather than in either a main memory or a register file during reuse of said state data.

27. The method of claim 26 wherein coupling said second multifunctional memory to said bus includes performing a direct memory access process for establishing a data path between said external entity and said second multifunctional memory.

28. The method of claim 27 further comprising transmitting either configuration data or peripheral device data originating from a peripheral device, or both, from said external entity to said second multifunctional memory.

29. The method of claim 26 wherein the interval of time is a first interval of time,
the method further comprising configuring said first and said second multifunctional memories during a second interval of time to perform at least one of the following:
storing initial data in at least one of said first and said second multifunctional memories prior to run time of an application associated with the extended instruction,
coupling said first and said second multifunctional memories via an exchanger circuit such that a double buffer is formed, and
coupling said first and said second multifunctional memories to a function generator circuit to form a wide Boolean function output.

30. The processing node of claim 1 wherein the state data is used to restore a state of the module processing element after the computation has been interrupted.

31. The processing node of claim 2 wherein the configuration data is used to change a configuration of the module processing element after the computation associated with the extended instruction is completed.

32. The processing node of claim 1 wherein the extended instruction is a first extended instruction, the state data is not provided to the modular processing element for execution based on a second extended instruction as an operand.

33. The processing node of claim 1 wherein the state data is defined in response to an operand data being computed by the modular processing element based on the extended instruction, the state data is used to define a state associated with the modular processing element.

34. The processing node of claim 1 wherein the state data is not transferred over a non-reconfigurable path.

35. The processing node of claim 1 wherein the first data transferred from the first multifunctional memory is a first portion of a continuous stream of data, the second data routed into the second multifunctional memory is a second portion of the continuous stream of data, the computation is associated with the continuous stream of data.

36. The processing node of claim 1 wherein at least one of the first multifunctional memory or the second multifunctional memory is implemented as a reconfigurable multifunctional memory.

37. The processing node of claim 1 further comprising a function generator circuit, at least one of the first multifunctional memory or the second multifunctional memory being configured to change from a first configuration to a second configuration when the function generator circuit changes from a first configuration to a second configuration.

* * * * *

UNITED STATES PATENT AND TRADEMARK OFFICE
CERTIFICATE OF CORRECTION

PATENT NO. : 7,526,632 B1　　　　　　　　　　　　　　　　　　　　　　Page 1 of 1
APPLICATION NO. : 10/971372
DATED : April 28, 2009
INVENTOR(S) : Charle' R. Rupp et al.

It is certified that error appears in the above-identified patent and that said Letters Patent is hereby corrected as shown below:

Applicant requests that the Certificate of Correction add to the written description, at Column 2, line 10, after the word "implementations" and before the word "inputs" the following:

--require synthesizing programmable logic to form a relatively large number of small (e.g., 2-4--

Signed and Sealed this

Eighteenth Day of August, 2009

David J. Kappos
*Director of the United States Patent and Trademark Office*